Patented Jan. 24, 1950

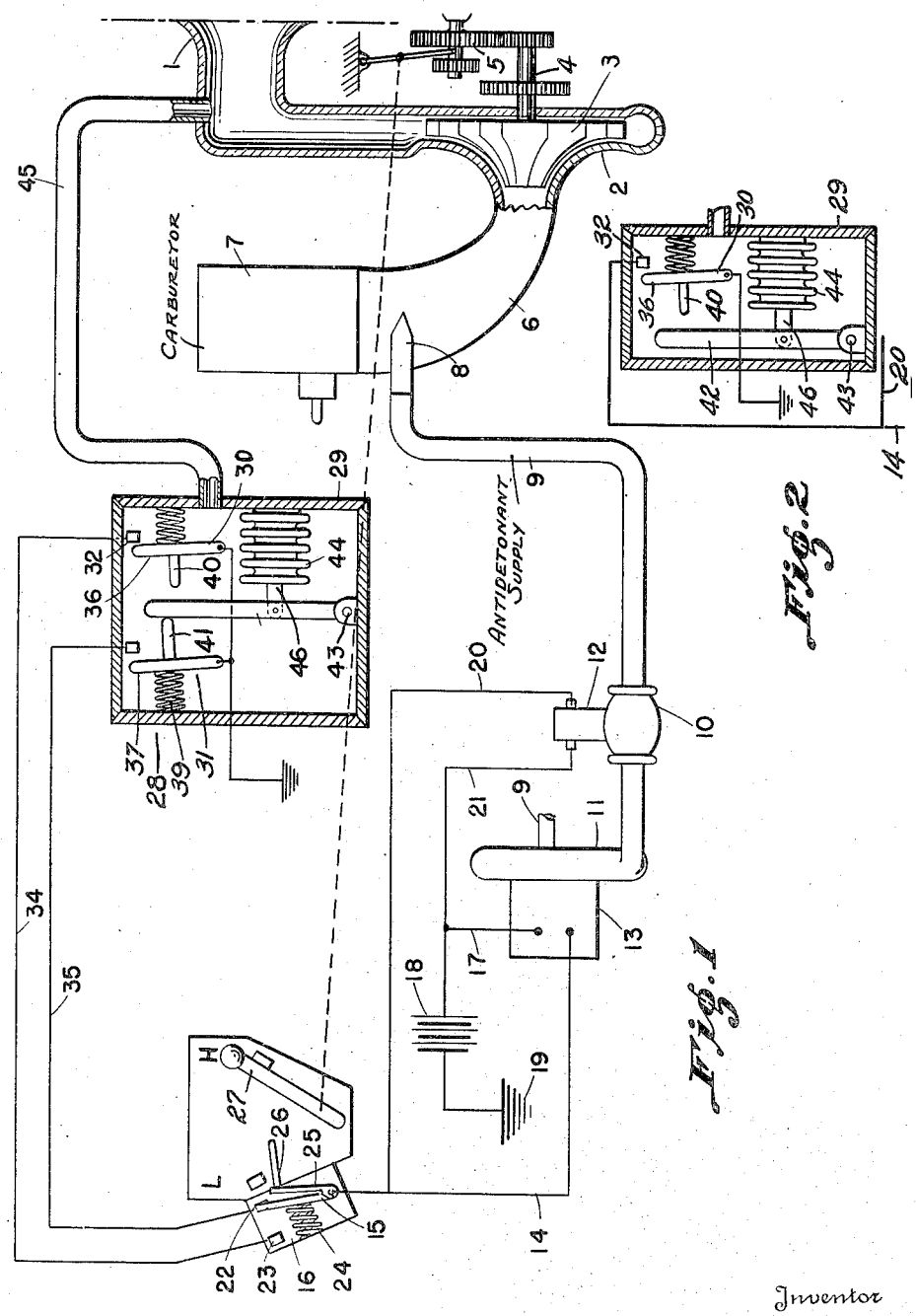

2,495,231

UNITED STATES PATENT OFFICE 2,495,231

ANTIDETONANT FLOW CONTROL SYSTEM

Thomas A. Dickey, United States Navy

Application May 22, 1945, Serial No. 595,218

2 Claims. (Cl. 123—25)

(Granted under the act of March 3, 1883, as amended April 30, 1928; 370 O. G. 757)

This invention relates to new and useful improvements in fluid flow control systems, and more particularly to systems for controlling automatically the flow of an anti-detonant liquid to an internal combustion engine.

In the use of internal combustion engines, and particularly those employed to power aircraft, it has been proposed to inject a liquid such as, for example, water, into the fuel mixture as it flows from the carburetor into the cylinders of the engine for the purpose of eliminating, or substantially reducing, engine detonation or knock.

The injection of anti-detonant liquid, as aforesaid, usually is not required below a predetermined engine manifold pressure. It is desirable therefore to provide suitable means for initiating the flow of anti-detonant to the engine when the manifold pressure therein rises to a predetermined value, and to cause the flow of anti-detonant to cease when the manifold pressure falls below that value. Furthermore, in the case of aircraft internal combustion engine of the single-stage air pump type, having a two-speed gear transmission associated therewith for driving the supercharger at relatively higher and lower speeds, the limiting manifold pressure above which anti-detonant is required is greater in low speed gear than it is in high speed gear and an adequate control system for starting and stopping the flow of anti-detonant to such an engine at a predetermined limiting manifold pressure at each supercharger speed, must take into consideration both the manifold pressure and the supercharger gear ratio.

With the foregoing in mind, it is the principal object of the present invention to provide a liquid anti-detonant flow control system for internal combustion engines that is operable in response to a predetermined engine manifold pressure.

Another object of the invention is to provide a flow control system of the character set forth for internal combustion engines of the single-stage, two-speed supercharger type that is operable in response to different predetermined manifold pressures at each supercharger speed.

Another object of the invention is to provide a fluid flow control system of the type described that is operatively controlled by operation of the supercharger change speed mechanism.

A further object of the invention is to provide an anti-detonant flow control system that is entirely automatic in operation, and which is of relatively simplified construction and wholly reliable in use.

These and other objects of the invention, and the various features and details of the construction and operation thereof, are herein fully set forth and described with reference to the accompanying drawings, in which:

Figure 1 is a diagrammatic view illustrating an embodiment of the present invention for use only with two speed supercharger units, and Figure 2 is a partial view thereof illustrating a modification which may also be used with single speed supercharger combinations.

Referring now to the drawings, reference numeral 1 designates the intake manifold of an internal combustion engine of the single-stage air pump type utilized to power aircraft. The inlet to the manifold 1 is connected to the discharge of a conventional type supercharger 2 having a pump member 3 rotationally mounted therein and adapted to be driven by a shaft 4 that is in turn driven either directly or through a suitable two-speed gear transmission shown in Figure 1 selectively actuated to a high or low speed gear ratio by means of a gear shift mechanism 5. The intake of the supercharger 2 is connected, by means of a substantially funnel shaped conduit 6, to a fuel carburetor 7 of conventional type.

Entering the conduit 6 at a suitable location, for example, adjacent the carburetor end thereof, is the discharge end of an injector nozzle 8 through which an anti-detonant fluid, such as water, is injected into the fuel mixture and fed therewith into the internal combustion engine to eliminate or substantially reduce engine detonation or knock. Anti-detonant liquid is conducted to the nozzle 8 by a pipe 9 having therein a suitable flow control valve 10 and a pump 11 that operates to force anti-detonant liquid through the pipe 9 to nozzle 8 at a predetermined rate of flow when the valve 10 is open.

In accordance with the present invention, the flow control valve 10 may be of the normally closed type that is actuated to open position by means of an associated solenoid or similar electrical device indicated at 12, and the pump 11 may be driven by a suitable electric motor 13. As shown in the drawing, one terminal of the pump motor 13 is connected by an electrical conductor 14 to the movable contact arm 15 of a single-pole double throw switch 16 that is cooperatively associated with the gear shift lever mechanism 5 in a manner more particularly described hereinafter, and the other terminal of said motor 13 is connected by an electrical conductor 17 to one terminal of a suitable source of electrical potential, for example, a battery 18, the other terminal thereof being grounded as indicated at 19. The valve solenoid 12 is connected in parallel circuit arrangement with respect to the pump motor 13, by means of electrical conductors 20 and 21 that are connected to the motor conductor 14 leading to switch contact 15 and to the motor conductor 17 leading to the battery 18, respectively.

Forming a part of the switch 16 and cooperatively disposed with respect to the movable contact arm 15, at opposite sides thereof, is a pair of fixed switch contacts 22 and 23, respectively. The movable switch contact arm 15 is biased by a coil spring or the like 24 normally into contact with the fixed switch contact 22 as shown in the drawing so that the arm 15 can be actuated into contact with the other fixed contact 23 only by movement of said contact 15 against the bias or force of the spring 24. Carried by the movable contact arm 15 is a leaf spring 25 that mounts a finger or like element 26, and the switch structure 16 is mounted and arranged endwise of the gear shift mechanism 5 so that the said finger 26 normally projects into the path of travel of the gear shift lever 27 at the left hand or low speed position thereof, the said lever 27 being shown in the drawing in the righthand or high speed position.

From the foregoing it will be seen that with the gear shift lever 27 in the high speed position shown, or in any position other than low speed position, the movable switch arm 15 will be in engagement with the fixed contact 22 by virtue of the bias or force exerted on said arm by the spring 24. However, when the lever 27 is moved into low speed position, the said lever will actuate the finger 26, carried by contact arm 15, in an outward direction, thereby in turn actuating the said arm 15 into engagement with the other fixed contact 23 against the action of the spring 24, the said contact arm 15, being held in position against contact 23 by the gear shift lever 27 as long as the latter remains in low gear position.

In accordance with the present invention and to control the flow of anti-detonant to the internal combustion engine at predetermined minimum manifold pressure that is greater at low supercharger speed than at high supercharger speed, there is provided a selective switch device, designated generally as 28, that is operable automatically in response to predetermined engine manifold pressures to initiate and interrupt anti-detonant flow to the engine. The device 28 comprises a sealed, air tight casing or chamber 29 which houses a pair of single-pole, single-throw switches 30 and 31 respectively.

Switches 30 and 31 have fixed contacts 32 and 33 that are connected, respectively, to the fixed contacts 23 and 22 of switch 16 by means of suitable conductors 34 and 35. Cooperably mounted for engagement with each fixed contact 32 and 33 is a movable contact arm 36 and 37, respectively, that is electrically grounded as shown. The arm 36 of switch 30 is normally biased into open circuit position with respect to its fixed contact 32 by means of a coil spring or the like 38, and the arm 37 of switch 31 is normally biased into closed circuit position with respect to its fixed contact 33 by means of a coil spring or the like 39. The contact arms 36 and 37 each carry a finger element 40 and 41, respectively, and these fingers project in opposite directions toward each other, a predetermined spacing being provided intermediate their free ends.

Selective opening and closing of the switches 30 and 31 may be effected, for example, by means of a member 42 that is pivotally mounted at its lower end to the base of the casing 29, as indicated at 43, and has its other or free end interposed between the relatively spaced free ends of the switch fingers 40 and 41. In accordance with the present invention the member 42 is actuated by the engine manifold pressure operating upon an evacuated, expansible-contractible "Sylphon" type bellows 44. The casing 29 is connected by means of a pipe 45 to the intake manifold 1 of the internal combustion engine, and hence it will be clear that the pressure within the casing 29 will be the same at all times as the pressure existing within the intake manifold 1 of the engine. The evacuated bellows 44 is supported at one of its ends from a wall of the casing 29 and has its other end pivotally connected to the member 42 by means of a link or the like 46, the axis of the latter being disposed approximately at right angles to the axis of the member 42.

The construction arrangement of the bellows 44 is such that as the manifold pressure within the casing 29 increases the said bellows 44 is caused to contract axially thereby moving the member 42 to the right as viewed in the drawing, and as the manifold pressure decreases the bellows 44 will expand or elongate axially thereby actuating the member 42 in the opposite direction, or to the left. In addition, the construction and arrangement of the bellows 44, and switches 30 and 31, is such that at pressures below a predetermined manifold pressure, the relative expansion or axial length of the bellows causes the member 42 to remain in engagement with the finger 41 of switch 31 thus displacing said finger and the contact arm 37 outwardly to the left against the action of spring 39 and maintaining the switch 31 in open circuit relation, the switch 30 likewise being maintained in open circuit relation by the action of its spring 38, all as shown in the drawing.

With both switches 30 and 31 open as aforesaid, the pump 11 remains idle and valve 10 will be closed so that no anti-detonant liquid flows through the pipe 9 and nozzle 8 to the internal combustion engine. This condition will continue to exist until the pressure in the manifold 1 and casing 29 reaches a predetermined value at which time the pressure will have collapsed the bellows 44 sufficiently to cause the member 42 to move to the right, as viewed in the drawing, a distance to permit the spring 39 to move the contact arm 37 of switch 31 into closed relation with its fixed contact 33.

Now if the gear shift lever 21 is in the high speed position shown in the drawing, the contact arm 15 of the switch 16 will be closed with the contact 22 thereby completing an electric circuit through the motor 13 and solenoid 12 to drive the pump 11 and open valve 10 so that anti-detonant flows through pipe 9 to nozzle 8 by which it is injected into the fuel mixture being supplied to the engine. If, however, the gear shift lever 27 is in the low gear position with the arm 15 of switch 16 closed with relation to the other contact 23, closing of switch 31 as aforesaid will not operate to cause the flow of anti-detonant to the engine, nor is anti-detonant required at such manifold pressure for efficient operation of the engine at low supercharger speed.

Assuming that gear shift lever 27 is now moved to the low speed position, with the arm 15 of switch 16 engaging contact 23, continued increase of the manifold pressure above that operable to close switch 31, with further contract the bellows 44 until the manifold pressure rises to a second predetermined value at which time the member 42 will have been moved to the right, as viewed in the drawing, a distance sufficient to close switch 30, thereby completing the circuit through motor 13 and solenoid 12 to drive pump 11 and open the valve 10 thereby causing anti-detonant to be injected into the engine. Should the gear shift lever 27 now be moved to the high speed position shown in the drawing, opening the contacts 15 and 23 of the switch 16, and closing contact 15 with contact 22, anti-detonant will continue to flow since switch 31 has remained closed, and will continue to remain closed until the manifold pressure falls below the predetermined manifold pressure required to maintain the bellows 44 sufficiently contracted to hold the member 42 in a position permitting the spring 39 to hold switch 31 closed. When the pressure falls below this predetermined value, the bellows 44 will have expanded sufficiently to actuate member 42 to the left against the action of spring 39 to open the switch 31 causing the flow of anti-detonant to cease.

In installations of the present invention employed in conjunction with certain two-stage air pump internal combustion engines wherein the limiting manifold pressure at which injection of anti-detonant is required is the same in both high and low supercharger speed or direct driven supercharger combination having a single speed, the switches 16 and 31 may be eliminated, along with the conductors 34 and 35, and the pump motor 13 and valve solenoid 12 may be connected to the switch 30 by connecting the conductor 14 directly to the fixed contact 32 of said switch 30, for example, by means of a conductor 47 as shown in Figure 2. With this arrangement, the bellows 44 will operate as aforesaid to actuate the member 42 and close switch 30 when the predetermined manifold pressure is reached regardless of whether the lever 27 is in high or low gear position.

From the foregoing description it will be observed that the present invention provides a novel liquid anti-detonant flow control system for internal combustion engines that is operable automatically in response to predetermined manifold pressures. The invention further provides a novel flow control system of the stated character for engines of the two-speed supercharger type that is operable automatically in response to predetermined manifold pressures. The invention further provides a novel flow control system of the stated character for engines of the two-speed supercharger type that is operable automatically in response to predetermined manifold pressures at the different supercharger speeds so that at each such speed anti-detonant liquid is injected into the fuel mixture entering the engine at manifold pressures above a predetermined value.

While a particular embodiment of the invention has been shown and described herein, it is not intended that the invention be limited to such disclosure, but that changes and modifications may be made and incorporated within the scope of the claims.

The invention herein described and claimed may be manufactured and used by or for the Government of the United States of America for governmental purposes without the payment of any royalties thereon or therefor.

I claim:

1. An anti-detonant flow control system for internal combustion engines of the two-speed supercharger type having a gear shift member movable to high and low supercharger speed positions and a liquid line for supplying anti-detonant to said engine, comprising a pump and a normally closed valve in said liquid line, an electrical circuit including means to drive said pump and to open said valve, a pair of switches in said circuit arranged in parallel relation with respect to each other, a master switch associated with said gear shift member and cooperable therewith to connect the first of said pair of switches into said circuit in the low speed position of said shift member, actuating means for said pair of switches, and means operable in response to the engine manifold pressure to position said actuating means so that said pair of switches are open at manifold pressures below a predetermined value and are caused to close successively when the manifold pressure rises to said predetermined value and a relatively higher predetermined value, respectively.

2. An anti-detonant flow control system for internal combustion engines of the two-speed supercharger type having a gear shift member movable between high and low supercharger speed positions and a liquid line for supplying anti-detonant to said engine, comprising a pump and a normally closed valve in said liquid line, an electrical circuit including a motor to drive said pump and a solenoid to open said valve, a pair of switches in said circuit arranged in parallel relation with respect to each other, the first of said pair of switches being spring biased to closed position and the second thereof being spring biased to open position, a master switch in said circuit associated with said gear shift member and operable to connect the first of said pair of switches into said circuit in high speed position of the gear shift member and to connect the second of said pair of switches into said circuit in the low speed position of said gear shift member, said master switch being spring biased into closed circuit relation with the first of said pair of switches in the high speed position of said gear shift lever and actuable by the latter when in low speed position into closed circuit relation with the second of said pair of switches, common actuating means for said pair of switches, and means operable in response to the engine manifold pressure to position said actuating means so that said pair of switches are open at manifold pressures below a predetermined value and are caused successively to close when the manifold pressure rises to said predetermined value and a relatively higher predetermined value, respectively.

THOMAS A. DICKEY.

REFERENCES CITED

The following references are of record in the file of this patent:

UNITED STATES PATENTS

| Number | Name | Date |
|---|---|---|
| 1,268,680 | Cates | June 4, 1918 |
| 1,810,193 | Thomas | June 16, 1931 |
| 2,037,908 | Kimball | Apr. 21, 1936 |
| 2,177,908 | Musselier | Oct. 31, 1939 |
| 2,220,558 | VanDijck et al. | Nov. 5, 1940 |
| 2,221,405 | Nallinger | Nov. 12, 1940 |
| 2,392,565 | Anderson et al. | Jan. 8, 1946 |

Certificate of Correction

Patent No. 2,495,231 January 24, 1950

THOMAS A. DICKEY

It is hereby certified that errors appear in the printed specification of the above numbered patent requiring correction as follows:

Column 4, line 49, for "lever 21" read *lever 27*; line 70, for the word "with" read *will*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*